(12) United States Patent
Fujita et al.

(10) Patent No.: US 7,069,276 B2
(45) Date of Patent: Jun. 27, 2006

(54) COMPUTER SYSTEM

(75) Inventors: Takahiro Fujita, Yokohama (JP);
Manabu Kitamura, Yokohama (JP);
Koichi Kimura, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 09/927,712

(22) Filed: Aug. 10, 2001

(65) Prior Publication Data

US 2002/0194182 A1  Dec. 19, 2002

(30) Foreign Application Priority Data

Jun. 14, 2001 (JP) ............................... 2001-179484

(51) Int. Cl.
*G06F 17/30* (2006.01)
(52) U.S. Cl. ...................... 707/202; 707/200
(58) Field of Classification Search .................. 707/10, 707/202, 104.1, 102, 200; 370/351; 711/167; 709/105, 203, 202, 213, 214, 219, 227; 714/4, 714/6, 44; 725/115
See application file for complete search history.

(56) References Cited

U.S. PATENT DOCUMENTS

| | | | |
|---|---|---|---|
| 5,845,295 A | | 12/1998 | Houseman et al. |
| 5,970,495 A | * | 10/1999 | Baru et al. .................... 707/102 |
| 6,167,427 A | * | 12/2000 | Rabinovich et al. ......... 709/201 |
| 6,415,373 B1 | * | 7/2002 | Peters et al. ................. 711/167 |
| 6,625,747 B1 | * | 9/2003 | Tawil et al. ..................... 714/6 |
| 6,631,425 B1 | * | 10/2003 | Helland et al. ............. 709/332 |

OTHER PUBLICATIONS

Microsoft Corporation, Windows 95/98 PCs—An Introduction, 1998, pp. 1-4.*

* cited by examiner

*Primary Examiner*—Apu M. Mofiz
(74) *Attorney, Agent, or Firm*—Townsend and Townsend and Crew LLP

(57) ABSTRACT

The disk is connected to the server appliance via the network. The server appliance accessing the disk for storing the data is changed to change the server appliance processing the data. Here, the change of the server appliance for processing the data is simultaneously reflected to the setting of the service provided by the computer system.

11 Claims, 14 Drawing Sheets

FIG. 2
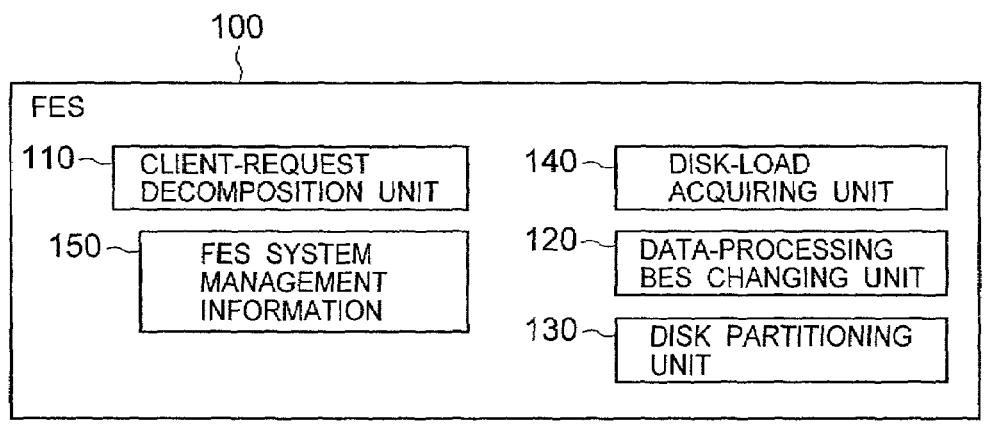
FIG. 3
| PARTITIONED DATA IDENTIFIER | DISK ID | DATA-PROCESSING BES APPLIANCE | DISK I/O |
|---|---|---|---|
| DATA1 | DID1 | BES1 | 20% |
| DATA2 | DID2 | BES1 | 20% |
| DATA3 | DID3 | BES2 | 20% |
FIG. 4
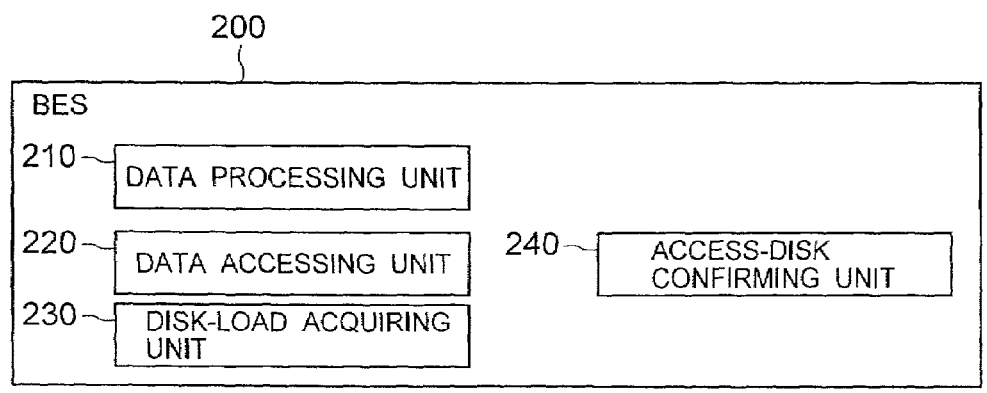

| BES | RELATED FES APPLIANCE | RELATED FES LIST | SERVER LOAD |
|---|---|---|---|
| BES1 | FES1 | FES1 | 60% |
| BES2 | FES1 | FES1 | 30% |
| BES3 | FES2 | FES2 | 60% |
| BES4 | NONE | FES2 | 0% |

| FES | SYSTEM NAME |
|---|---|
| FES1 | DBMS |
| FES2 | NFS |

| DISK ID | USE/NON-USE | STORAGE SYSTEM |
|---|---|---|
| DID1 | USE | RAID1111 |
| DID2 | USE | RAID1111 |
| DID3 | USE | RAID1111 |
| DID4 | NON-USE | RAID1111 |
| DID5 | NON-USE | RAID1111 |

| STORAGE PORT NAME | STORAGE SYSTEM ID | DISK NUMBER | PORT I/O NUMBER |
|---|---|---|---|
| WWNA | RAID1111 | 1 | 3333 |
| WWNB | RAID1111 | 3 | 9999 |
| WWNC | RAID1111 | 0 | 0 |

| SERVER NAME | SERVER PORT NAME | STORAGE SORTR ID | DISK ID |
|---|---|---|---|
| BES1 | WWN1 | WWNA | DID1 |
| BES2 | WWN2 | WWNB | DID2 |
| BES3 | WWN3 | WWNB | DID3 |
| BES3 | WWN3 | WWNB | DID4 |

…

COMPUTER SYSTEM

BACKGROUND OF THE INVENTION

The present invention is related to a management method of a distributed computer system on a storage area network environment.

A distributed computer system capable of improving the performance by distributing the processing into plural computers are widely utilized. Such a distributed computer system provides a client application with a service by way of a plurality of server appliances.

Also, a computer used in such a computer system includes a plurality of ports for connecting the computer to a storage system, and the storage system includes a plurality of ports for connecting the storage system to a plurality of computers. A disk (storage device) employed in the storage system is connected via these ports to the computers. When the interconnections between the disk and the computers are concentrated into one port, the load exceeds the processing capability of this port. As a result, in the case that there are plural ports, the load balance of these ports are performed in such a manner that the interconnections between the disk and the computers are established via other ports.

In a conventional distributed computer system, the server appliance and the storage system are connected to each other in the one-to-one correspondence. When the physical structure of the computer system is changed with the addition and deletion of the server appliance and the storage system in order to improve the maintenance of the server appliance, or to improve the processing performance of the entire computer system as well as to achieve the load balance of the entire computer system, the service provided by the computer system is completely stopped. Then, a system administrator changes the interconnection between the server appliance and the storage system, and also changes the system setting of the server appliance. Subsequently, the system administrator commences the service of this computer system. As a result, the system administrator is required to execute a large number of the system setting works.

Similarly, when the port load balance is performed, the system administrator is required to reconfigure the computer system after the computer system is stopped.

SUMMARY OF THE INVENTION

The present invention provides a method of automatically and easily changing a server appliance for processing data in a distributed computer system by carrying out for a service provided by the computer system without completely stopping the computer system, the maintenance of the server appliance, the addition and deletion of the server appliance for the improvement of the system processing capability and the load balance, and the distribution of data into a plurality of disks for the disk load balance. Thereby, the reliability of the computer system can be improved, the work load of a system administrator can be reduced, and the mistake causing system down by the system administrator can be lowered.

Also, the present invention provides means for changing a port used to interconnect a computer and a storage system without completely stopping a computer system.

A network is constituted between a server appliance and a storage system to physically connect the server appliance and the storage system. A group of data to be processed by the computer system are partitioned. A plurality of server appliances for processing the partitioned data and a plurality of disks storing the partitioned data are connected via the network. When the load of one server appliance processing certain partitioned data is increased, the disk storing the partitioned data is notified to a destination server appliance in order that a portion of the partitioned data processed by the server appliance having the heavy load is processed by another server appliance. Thereby, the processing related to the partitioned data is transferred. Here, the transfer of the processing related to the partitioned data is reflected on the setting of the service for providing the processing related to a group of data.

Furthermore, the partitioned data of certain group data is further partitioned. When the disk load balance is carried out by subdividing the further-partitioned data into a plurality of disks, a disk storing the further-partitioned data is notified to a server appliance to execute the processing of the further-partitioned data. Here, the fact that the partitioned data is further partitioned and the fact that the server appliance processing the partitioned data is allocated are reflected on the setting of the service for providing the processing related to the certain group data.

Also, the present invention provides a graphical human interface capable of changing the system structure for deleting and/or adding a server appliance for processing data from the services by representing a plurality of server appliances for providing the services to a system administrator by a symbol to move the symbol on a screen.

BRIEF DESCRIPTION OF THE DRAWINGS

For the better understanding of the present invention, reference is made of the detailed description to be read in conjunction with the accompanying drawings, in which:

FIG. 2 is a schematic block diagram of an FES appliance;

FIG. 3 represents FES system management information managed by the FES appliance;

FIG. 4 is a schematic block diagram of a BES appliance;

FIG. 8 shows server information managed by the system management server program;

FIG. 9 represents disk information managed by the system management server program;

FIG. 10 shows storage port information managed by the system management server program;

FIG. 11 represents node-to-node connection information managed by the system management server program;

DESCRIPTION OF THE EMBODIMENTS

First Embodiment

Figure 1:
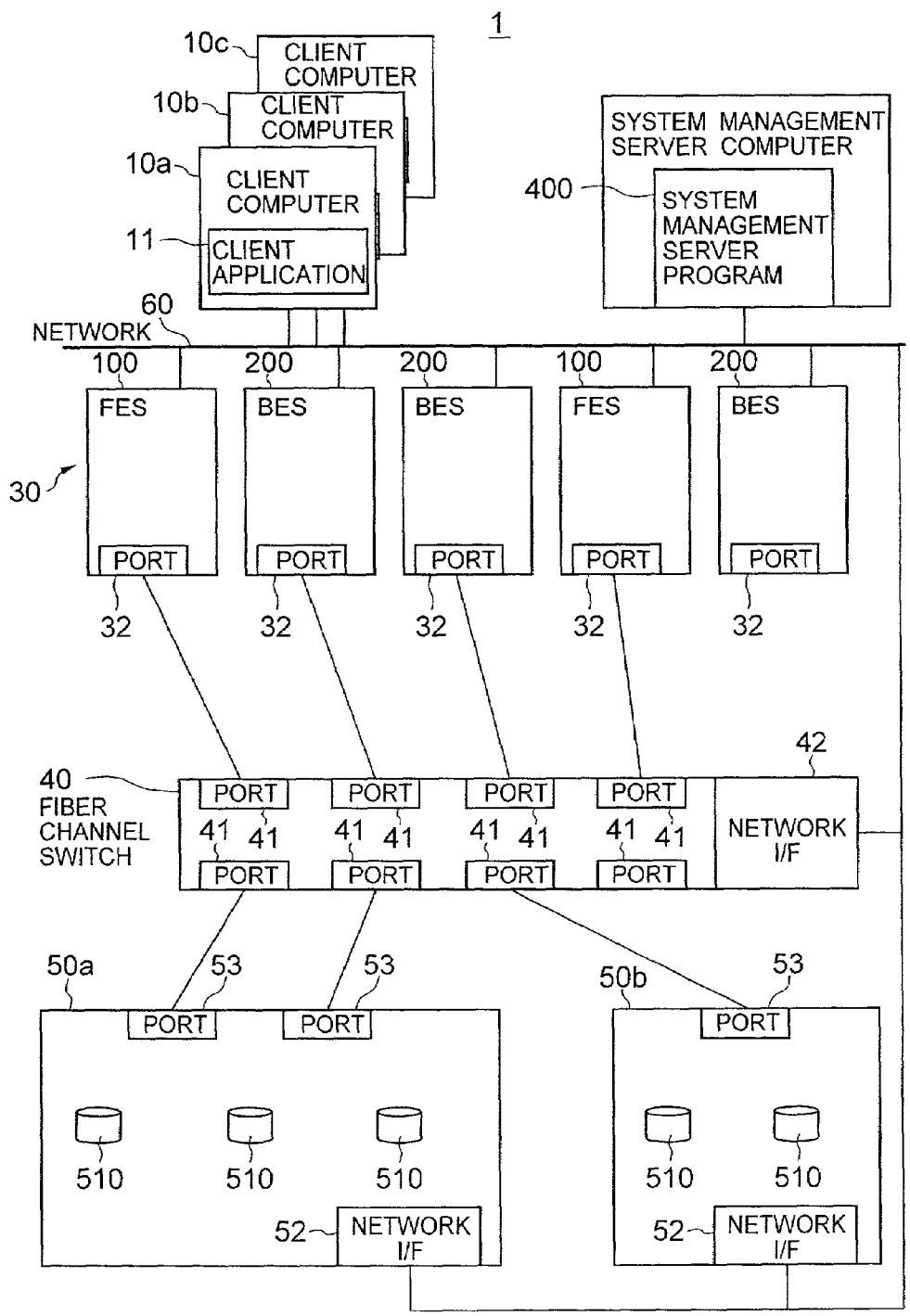
FIG. 1 is a structural diagram of a computer system to which the present invention is applied.

FIG. 1 is a structural diagram of a computer system to which the present invention is applied. The computer system 1 includes a plurality of client computers 10a and 10b (totally referred to as a "client application 10" hereinafter); a plurality of server appliances 30 (namely, FES (Front End Server) appliances 100 and BES (Back End Server) appliances 200); storage systems 50a and 50b (totally referred to as a "storage system 50" hereinafter) connected via a Fiber Channel switch 40 to these server appliances 30; and a network 60.

The storage system 50 includes disks 510, and storage ports 53 used to connect the storage system 50 to the server appliances 30. The disk 510 in this embodiment is a logical device, and is arranged by a plurality of physical disks. However, since the disk 510 has no direct relationship to the description of the embodiment, no explanation thereof is made. It should be noted that the disk 510 is not limited only to such a logical device.

When the server appliance 30 connected to the storage port 53 is an open system such as UNIX, the storage port 53 may be an interface of SCSI (Small Computer System Interface). Otherwise, when the server appliance 30 is a main frame, the storage port 53 may be a channel interface such as ESCON (Enterprise System CONnection). Alternatively, the respective storage ports 53 may be made from the same interfaces and/or from different sorts of interfaces. In this embodiment, it is assumed that all of the interfaces are made from the Fiber Channel interfaces.

The Fiber Channel switch 40 has a zoning function capable of limiting the connection between a server port 32 and the storage port 53 of the storage system 50. The Fiber Channel switch 40 may set the zoning by using a network interface 42. The server port 32 may access the storage port 53 within the same zone, whereas when the server port 32 and the storage port 53 belong to the different zones, no access operation can be done. The access operation may be limited by this zoning function. Although the zoning is not necessarily required, the zoning may prevent an unnecessary access operation from the server appliance 30 to the storage system 50. The interconnection between the ports will imply that the ports are located within the same zone.

The storage system 50 has a copy function capable of copying data of the disk 510 to another disk 510. The copy function is described in U.S. Pat. No. 5,845,295, for example.

Also, the storage system 50 applies an ID to the disk 510. The ID may guarantee that the disk 510 is exclusively recognized at least within the computer system 1. For example, the storage ID is produced by using the vendor name of the storage system 50, the serial number of the storage system 50, and the internal identifier of the disk 510.

The computer system 1 may provide at least one client computer with at least one service. A request issued from a client application with respect to a service provided in the computer system 1 is related to the processing for data having a certain implication. The service is provided by one FES appliance and at least one BES appliance. The data having the certain implication is divided into at least one to be stored in the disk. The FES appliance resolves the processing request issued from the client computer to the processing for the partitioned data. The partitioned data is stored in the disk, and the BES appliance which is instructed to access the disk and to process the partitioned data stored in this disk executes the processing.

For example, there is a file server as such a service. The FES appliance may provide the client application with a directory structure (virtual directory) as such data having certain implication. The data is partitioned every a directory having a certain upper grade. The partitioned data is stored in the disk. A read request to the file contained in the virtual directory, which is issued from the client application, is resolved into the processing for the partitioned data which is partitioned from the path name to the file every directory. A processing request is sent to the BES appliance which is instructed to access the disk in which the partitioned data is stored and to process the partitioned data. The BES appliance receiving the processing request reads out the data from the disk, and then transfers the data of the designated field to the client application. There is a Web server or a database system as such a service, too.

FIG. 2 is a schematic block diagram of the FES appliance 100. The FES appliance 100 includes a client-request decomposition unit 110, a data-processing BES changing unit 120, a disk partitioning unit 130, and a disk-load acquiring means 140, and is constituted by FES system management information 150.

The client-request decomposition unit 110 decomposes the request issued from the client application into the processing for the partitioned data referring to the FES system management information 150, and then allocates the decomposed processing to the BES appliance 200 which processes the partitioned data.

The data-processing BES changing unit 120 changes the method for allocating the BES appliance 200, which processes the partitioned data, by the client-request decomposition unit 110. In other words, when the client-request decomposition unit 110 allocates the partitioned data in such a manner that certain partitioned data is processed by a certain BES appliance, this certain partitioned data may be processed by another BES appliance different from the above-explained BES appliance by way of the change made by the data-processing BES changing unit 120.

The disk partitioning unit 130 further partitions the partitioned data which the client-request decomposition unit 110 decomposes the request issued from the client application. In other words, when certain partitioned data is present, the data is further partitioned into two or more partitioned data, and then these further partitioned data are processed by the proper BES appliances.

The disk-load acquiring means 140 acquires the disk load every disk which is acquired by the disk-load acquiring unit 230 of the BES appliance 200, and then updates the entry of the disk load of the FES system management information 150. The disk-load acquisition and the entry update operation are executed every time a certain constant time period has passed.

The FES system management information 150 is the information of the service provided by the computer system, which is managed by each of the FES appliances. As shown in FIG. 3, this FES system management information 150 manages the partitioned data identifier, the disk ID of the disk in which the partitioned data is stored, the BES appliance which accesses the disk for storing the partitioned data in order to process the partitioned data, and the disk load. Based upon this information, the client-request decomposition unit 110 decomposes the request issued from the client application, and also allocates the decomposed requests to the BES appliances. The data-processing BES changing unit 120 changes this information, and changes the BES appliance processing certain partitioned data. When the partitioned data is further partitioned, the entry is additionally provided with this information.

FIG. 4 is a schematic block diagram of the BES appliance 200. The BES appliance 200 includes a data processing unit 210, a disk accessing unit 220, a disk-load acquiring unit 230, and an access-disk confirming unit 240.

The data processing unit 210 processes data stored in a disk which can be accessed by the disk accessing unit 220. Concretely speaking, the data processing unit 210 executes the processing in which the data stored in the disk is read to provide a file in accordance with a protocol; the database processing in which the data stored in the disk is retrieved/updated; and another processing in which the data stored in the disk is read to provide data in accordance with a protocol.

The disk accessing unit 220 accesses the disk of the storage system 50.

The disk-load acquiring unit 230 acquires the load of the disk accessed by the disk access unit 220 of the BES appliance 200. For instance, the disk-load acquiring unit 230 acquires the number of I/O during a certain constant time duration, acquires the percent with respect to the maximum I/O number, at which the disk can process, and provides the disk-load acquiring unit 140 of the FES appliance 100 with the disk load information.

The access-disk confirming unit 240 checks the disk ID, which is exclusively guaranteed by the system, to confirm whether or not a certain disk may be accessed by the disk accessing means 220.

Figure 5:
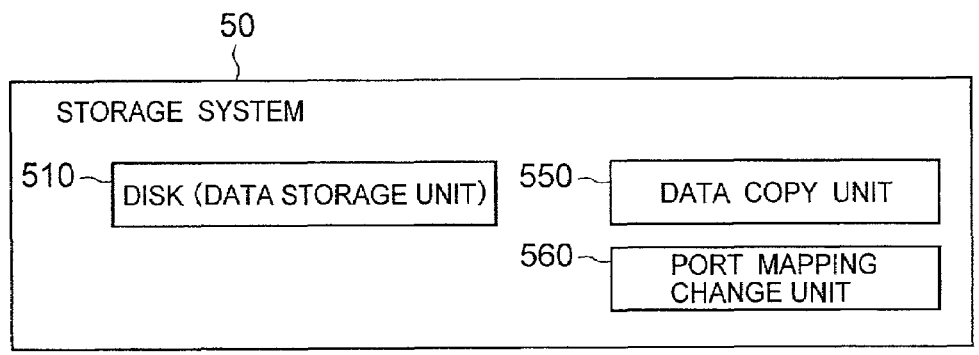
FIG. 5 is a schematic block diagram of a storage system.

FIG. 5 is a schematic block diagram of the storage system 50. The storage system 50 includes a disk 510 corresponding to the data storage means, a data copy unit 550, and a port mapping change unit 560.

The disk 510 is accessed by the disk accessing unit 220 of the BES appliance 200, and is exclusively identified by the disk ID which is exclusively used at least within the computer system 1. Although only one disk 510 is illustrated in FIG. 5, a plurality of disks 510 are generally employed in the storage system 510.

The data copy unit 550 copies the data stored in the disk 510 to another disk 510 different from the first-mentioned disk 510. The other disk 510 to which the data is copied need not be necessarily employed in the storage system 50 containing the copy-source disk 510, but may be employed in another storage system.

The storage system 50 includes a plurality of ports for accepting the access issued from the BES appliance 200 to the disk 510. The storage system 50 may determine via which port among these plural ports the disk 510 is connected to the BES appliance 200, and may change the relevant ports. The port mapping change unit 560 performs this port change.

Figure 6:
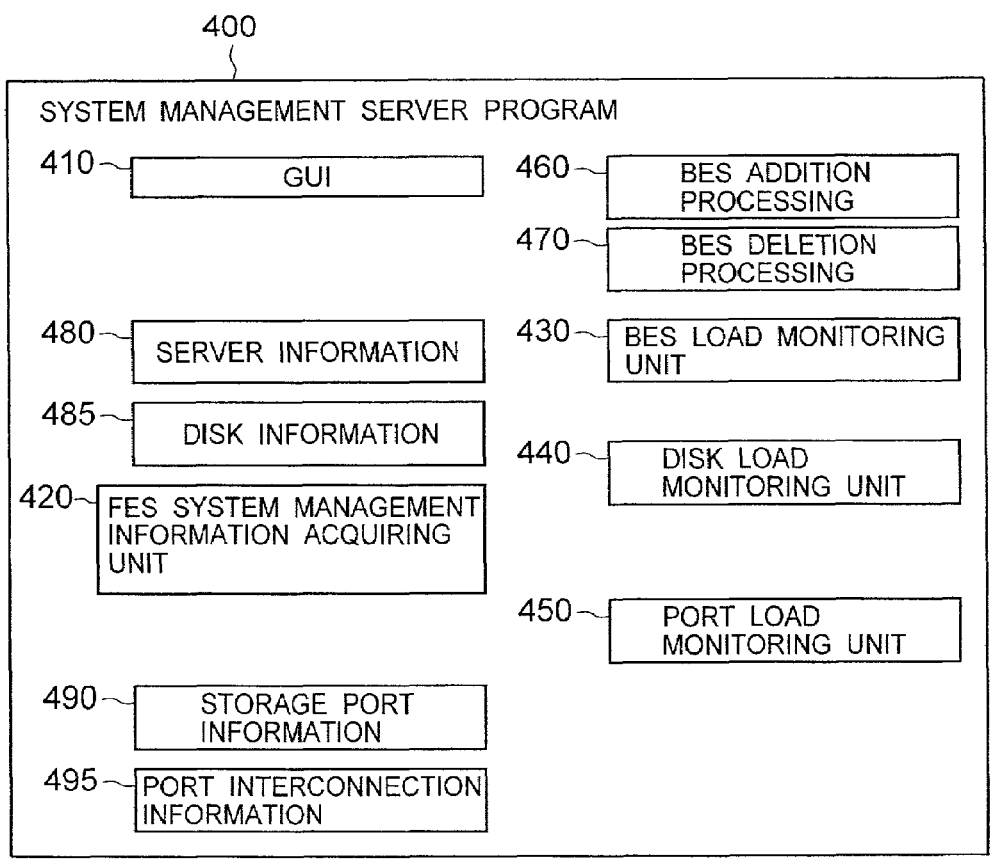
FIG. 6 is a schematic block diagram of a system management server program.

FIG. 6 is a schematic block diagram of a system management server program 400. The system management server program 400 includes a GUI 410, an FES system management information acquiring unit 420, a BES load monitoring unit 430, a disk load monitoring unit 440, a proper load monitoring unit 450, a BES addition processing 460, a BES deletion processing 470, server information 480, disk information 485, storage port information 490, and port connection information 495.

Figure 7:
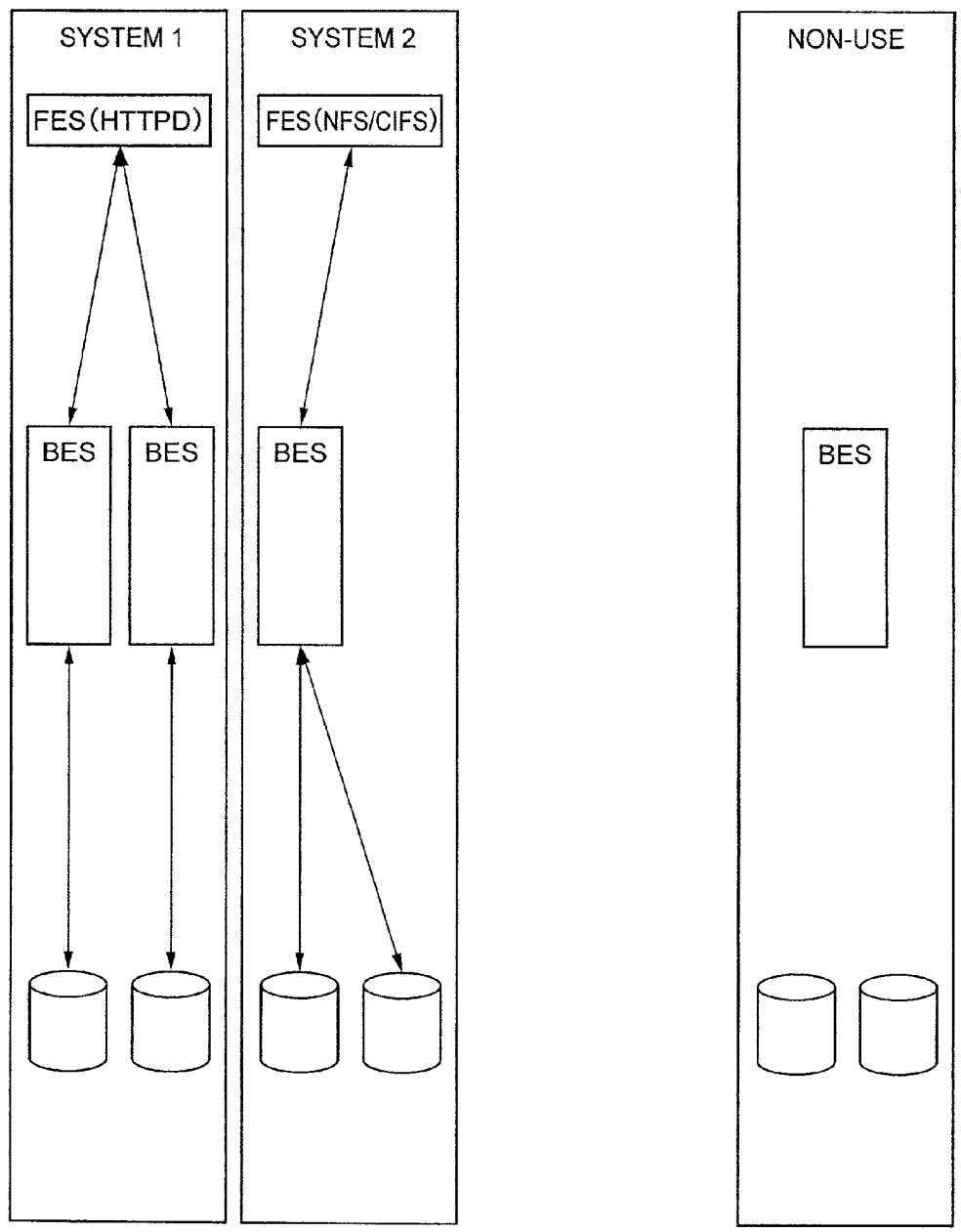
FIG. 7 indicates a GUI provided by a system management server program.

The GUI 410 provides an interface for easily managing services such as a file server, a database server and a Web server, which are provided by the computer system 1. As shown in FIG. 7, the FES appliance, the BES appliance and the disk are expressed by symbols. When the BES appliance handles the disk, the disk is connected to the BES appliance by a line. Every time a service is provided by the system, a rectangular shape is prepared, and the FES appliance, BES appliance and the disk, which provide the service, are indicated in the same rectangular shape. The BES appliance and the disk which are not used are indicated in a rectangular shape indicative of "non-use."

When the user moves the symbol of the BES appliance, which is contained within the rectangular shape indicative of the service, to the rectangular shape indicative of "non-use", the BES deletion processing 470 is executed. As a result, the partitioned data, which is moved to the "non-use" rectangular shape and is handled by the BES appliance, is allocated to another BES appliance for providing the service. Thereby, it is possible to cut the BES appliance away from the service without stopping the service by performing the simple operation by the GUI 410 when the server appliance is brought into the maintenance work. When the maintenance work of the server appliance is completed, the user returns the BES appliance, which exists in the "non-use" rectangular shape on the GUI 410, to the rectangular shape indicative of the service to execute the server addition process 460. Thereby, the user can return the entire performance of the service to the original performance.

The FES system management information acquiring unit 420 acquires the FES system management information 140 of the FES appliance 100.

The BES load monitoring unit 430 is means for acquiring the load of the BES appliance 200, and for updating the server information 480. When the overload of the BES appliance 200 is detected by the magnitude of the load exceeding a certain threshold value, the BES load monitoring unit 430 executes the data-processing BES changing processing 120 in order to distribute the server load. This processing is executed every time a certain constant time period has passed.

The disk load monitoring unit 440 acquires the FES system management information 140 of the FES appliance 100 by using the FES system management information acquiring unit 420. When the overload of the disk is detected by the magnitude of the disk load exceeding a certain threshold value, the disk load monitoring unit 440 executes the disk partition processing 130 in order to distribute the disk load. This processing is executed every time a certain constant time period has passed.

The port load monitoring processing 450 is means for acquiring the load of the storage port from the storage system, and for updating the port load of the storage port information 490. When the overload of the port is detected by the magnitude of the load exceeding a certain threshold value, the port load monitoring process 450 changes the port of the storage system, via which the disk is connected to the server, in order to distribute the port load. This processing is carried out every time a certain constant time period has passed.

The BES addition processing 460 is the processing which is executed when a system administrator performs the operation to add a BES appliance 200 to service provided by the computer system 1 on the GUI 410. The BES addition processing 460 enables the disk access unit 230 of the new-added BES appliance 200 to access the disk for storing certain partitioned data. Thereby, it is possible to process the partitioned data of the service in the new-added BES appliance 200.

The BES deletion processing 470 is the processing which is executed when a system administrator performs the operation to delete a BES appliance 200 from service provided by the computer system 1 on the GUI 410. The BES deletion processing 470 enables the disk access unit 23 of another BES appliance 200 providing the same service to access the disk for storing the partitioned data which is handled by the BES appliance 200 to be deleted. Thereby, the processing related to the partitioned data which is handled by the BES appliance 200 to be deleted is transferred to another BES appliance.

The server information 480 is related to the FES appliance 100 and the BES appliance 200, which are used in the computer system 1. The server information 480 is constituted by two tables as shown in FIG. 8. One of these two tables is constructed of the BES name, the FES name to which the BES presently belongs, the list of the FES appliances to which the BES can belong, and the server load of the BES appliance. The other of these two tables is constructed of the FES name, and the system name of service provided by the FES appliance.

The disk information 485 is the information related to the disk 510 provided in the computer system 1. As shown in FIG. 9, the disk information 485 is a table constituted by the disk ID, the present use condition, and the storage system in which the disk is included. The disk information 485 is used to check whether or not there is any non-used disk when the data partitioning into multiple disks is made.

The storage port information 490 is the information related to the port of the storage system. As shown in FIG. 10, the storage port information 490 is a table constituted by the port name of the storage port, the ID of the storage system, the number of disks, and the port load. The storage port name is the World Wide Name (abbreviated as a "WWN" hereinafter) of the port of the storage system. The storage system ID is the identifier of the storage system which is exclusively defined within the system. The number of disks is the number of the disks 510 which are connected via the above-explained storage port to BES appliances 200. The port load is the load of the above-explained storage port.

The port connection information 495 is the information related to the port which is used for the connection between a BES appliance 200 and a disk 510. As shown in FIG. 11, the port connection information 495 is a table which is made of the server name, the server port name, the storage port name, and the disk ID. The server name is the name of the BES appliance 200 accessing the disk 510. The server port name is the WWN of the server port used in the above-explained access operation. The storage port name is the WWN of the port of the storage system 50 used in the above-described access operation. The storage system ID is the identifier of the above-described storage apparatus 50.

Next, the processing flow in this embodiment will be described with reference to flow charts.

Figure 12:
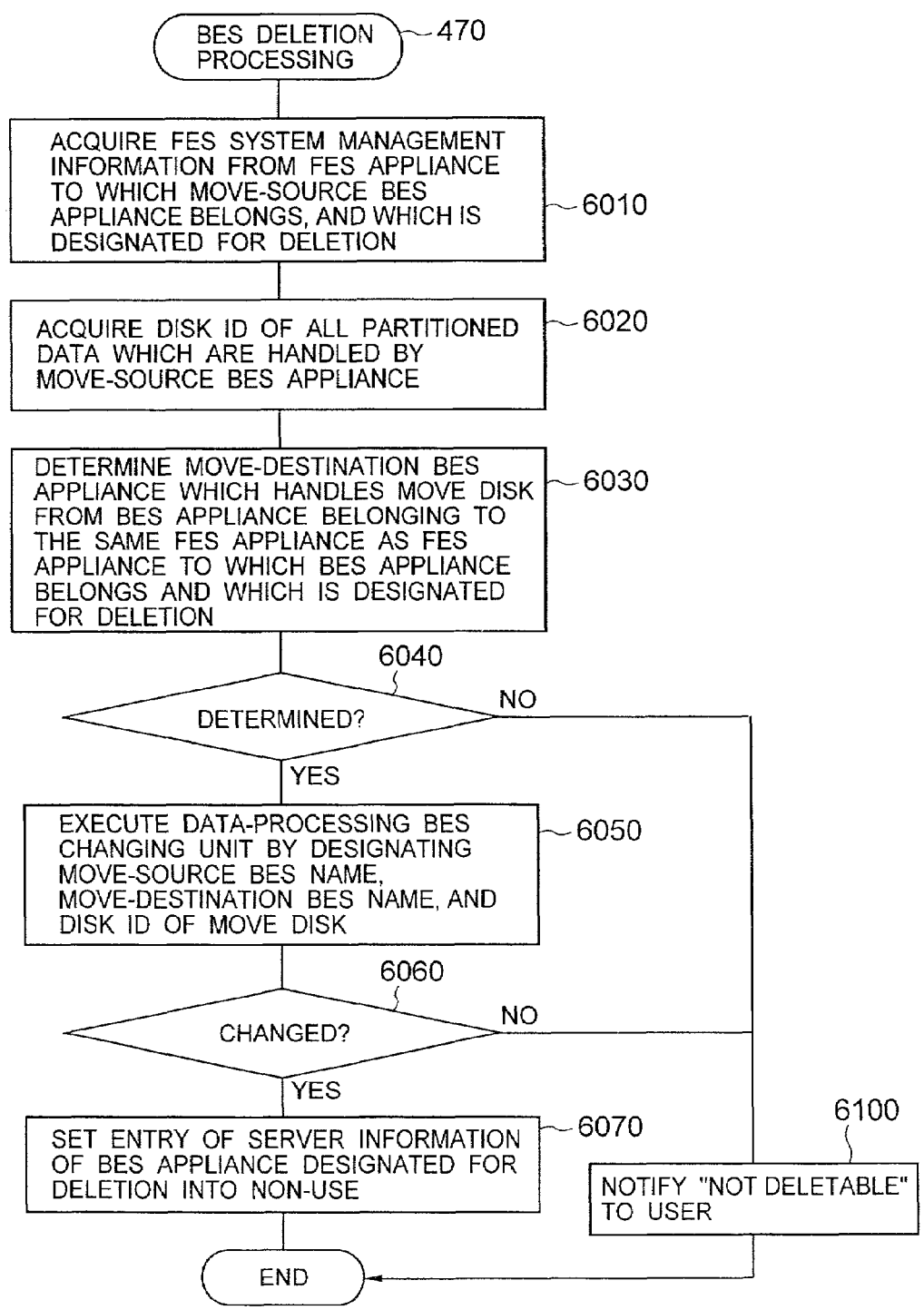
FIG. 12 shows a processing flow of the BES deletion processing in the system management server program.

The BES deletion processing 470 executed when a symbol of a BES appliance is moved from a rectangular shape indicative of service to a non-use rectangular shape by the GUI 410, which constitutes the operation for deleting a BES appliance, will now be explained with reference to FIG. 12.

At a step 6010, the FES appliance to which the BES appliance designated to be deleted belongs is specified from the server information 480, and then the FES system management information 150 is acquired from the specified FES appliance.

At a step 6020, all of the partitioned data which are handled by the BES appliance designated to be deleted, and the disk ID of the disk for storing the partitioned data are acquired form the FES system management information 150.

At a step 6030, a move-destination BES appliance which takes over the partitioned data is determined among the BES appliances belonging to the same FES appliance as the BES appliance designated to be deleted from the server information 480.

At a step 6040, when the move-destination BES appliance cannot be determined, a notification that the deletion cannot be done is made to a system administrator at a step 6100, and then this processing is accomplished. To the contrary, when the move-destination BES appliance can be determined, the processing is advanced to a step 6050.

At the step 6050, the data-processing BES changing unit 120 of the FES appliance to which the move-destination BES appliance belongs is executed by designating the deletion-designated BES appliance as the move-source BES appliance, by designating the partitioned data handled by the move-source BES appliance, and by designating the move-destination BES appliance determined at the step 6030.

At a step 6060, when the BES appliance cannot be changed, a notification that the deletion cannot be done is made to a system administrator at the step 6100, and then the processing is ended. To the contrary, when the BES appliance can be changed, the entry of the server information 480 of the BES appliance designated to be deleted is changed into the "non-use" at a step 6070.

This processing may also be executed in the case that the data processing is taken over another BES appliance in order to continue the service provided by the system when a certain BES appliance is brought into a malfunction state.

Figure 13:
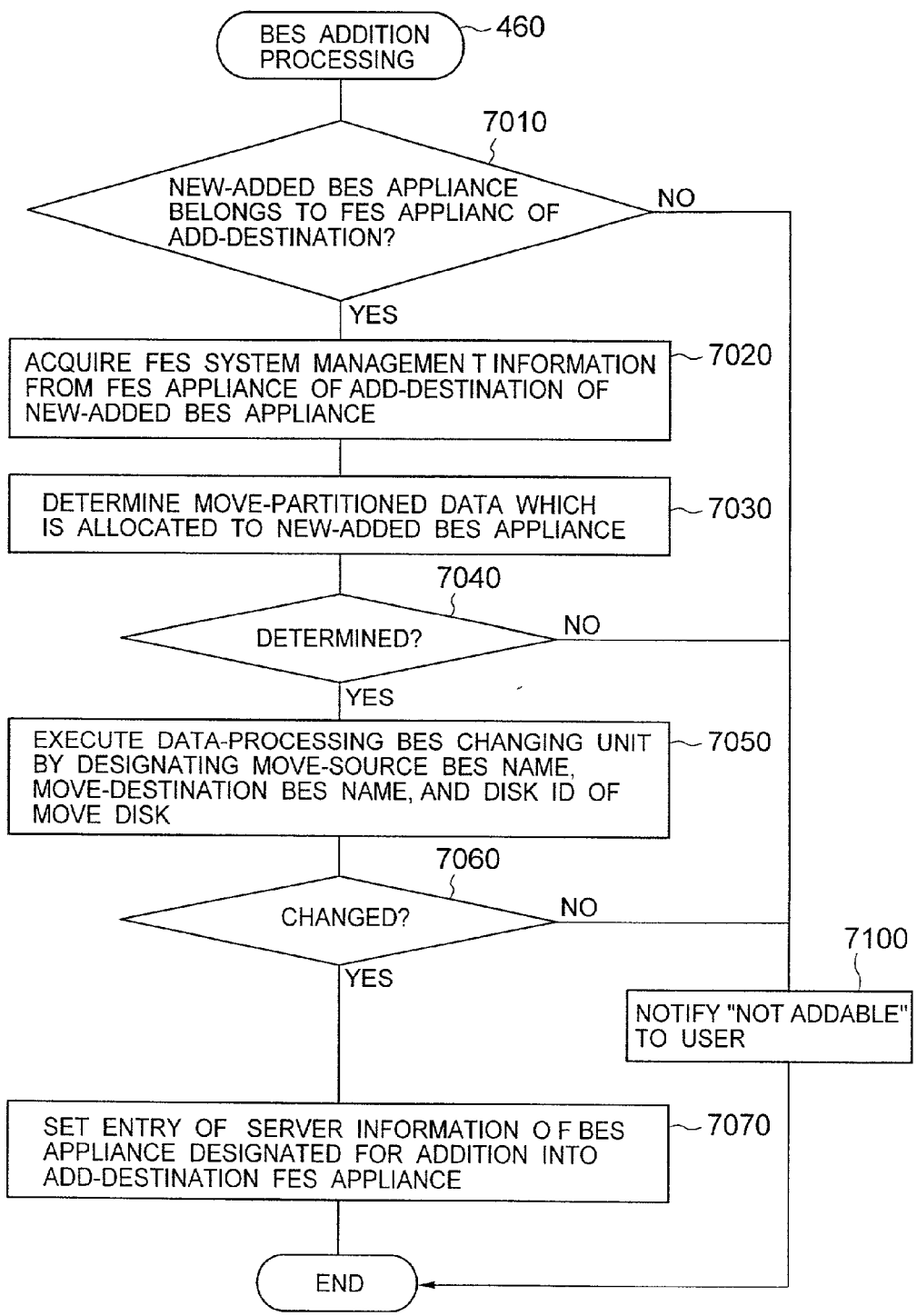
FIG. 13 shows a processing flow of the BES addition processing in the system management server program.

Referring to FIG. 13, the BES addition processing 460 executed when a symbol of a BES appliance is moved from a "non-use" rectangular shape to another rectangular shape indicative of the service by the GUI 410, which constitutes the operation capable of adding a BES appliance will be described.

At a step 7010, it is checked whether or not a new-added BES appliance can belong to the FES appliance of the added-destination service, based on the server information 420. When the new-added BES appliance cannot belong to the FES appliance, a notification of "not added" is made to a system administrator at a step 7100, and then the processing is ended. To the contrary, when the new-added BES appliance can belong to the FES appliance, the processing is advanced to a step 7020.

At the step 7020, the FES system management information 150 is acquired from the FES appliance of the added-destination.

At a step 7030, a being moved partitioned data is determined which is allocated from the FES system management information 150 to the added BES appliance.

At a step 7040, when the being moved partitioned data cannot be determined, a notification of "not added" is issued to the system administrator at a step 7100, and then the processing is ended. To the contrary, when the being moved partitioned data can be determined, the processing is advanced to a step 7050.

At the step 7050, the data-processing BES changing unit 120 of the FES appliance is executed by designating the BES appliance handling the being moved partitioned data as a move-source BES appliance, and by designating the being moved partitioned data and the added BES appliance as a move-destination BES.

At a step 7060, when the BES appliance cannot be changed, a notification of "not added" is issued to a system administrator at the step 7100, and then the processing is ended. To the contrary, when the BES appliance can be changed, the processing is advanced to a step 7070.

At the step 7070, the FES name of the added BES entry in the server information 480 is changed into the FES appliance of the service to which the BES appliance is added.

This processing may be carried out also in such a case that the overall performance of the service is improved by adding the BES appliance when the load of the entire service is increased, other than such a case that the BES appliance whose maintenance has been carried out is returned to the service when the maintenance operation is accomplished.

Figure 14:
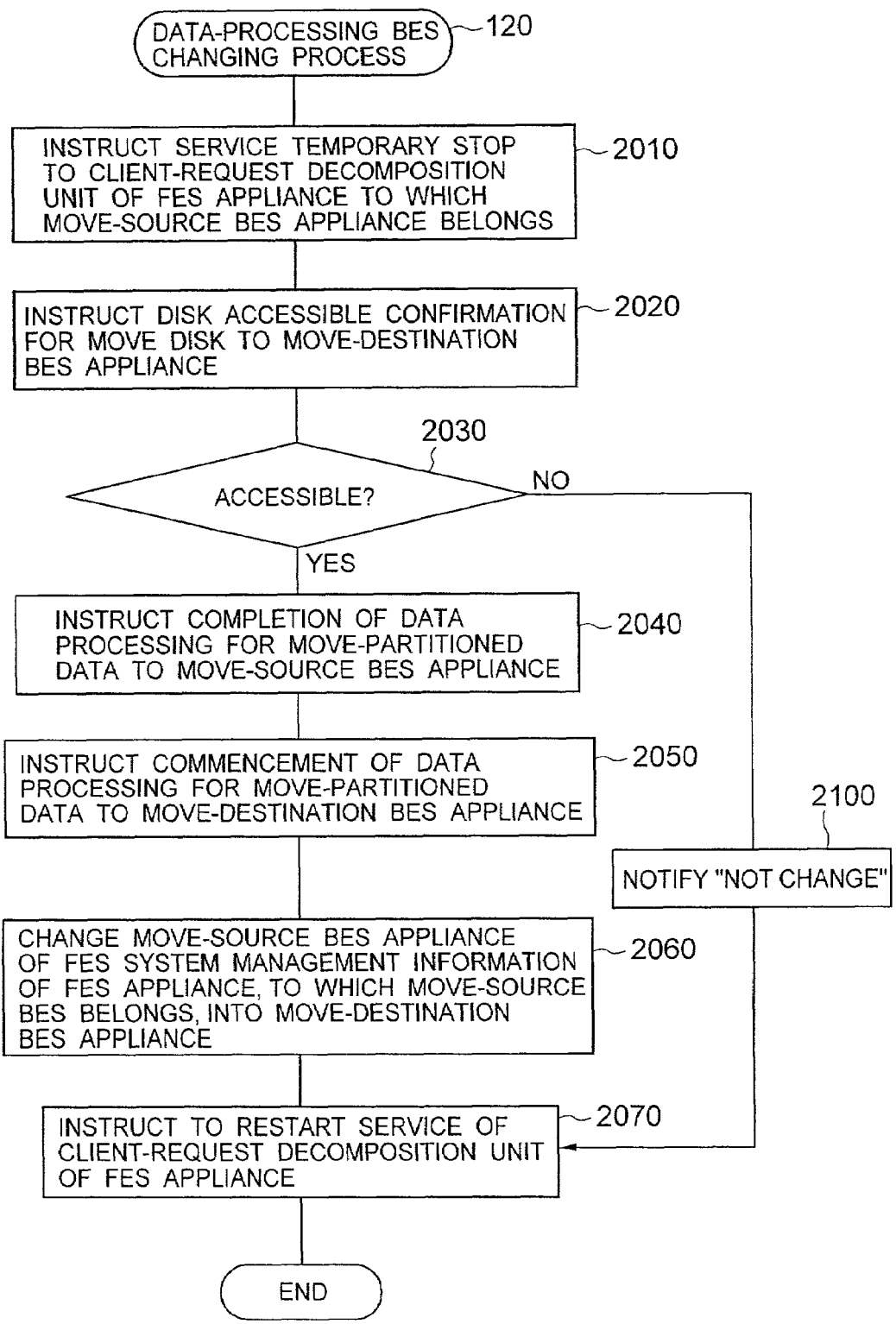
FIG. 14 shows a processing flow of the data-processing BES change processing in the FES appliance.

Next, a description will now be made of the data-processing BES changing process 120 executed in the BES appliance 460 and the BES deletion processing 470 with reference to FIG. 14.

At a step 2010, a service temporary stop is instructed to the client-request decomposition unit 110 of the FES appliance. Thereby, the decomposition of the processing from the client computer and the allocation of the processing to the BES appliance are temporarily interrupted.

At a step 2020, with respect to the move-destination BES appliance of the processing for partitioned data, the disk ID of the disk storing the partitioned data is transferred to instruct the confirmation of the disk access possibility. Upon receipt of this instruction, the BES appliance confirms as to whether or not the disk 510 having the designated disk ID can be accessed by way of the access-disk confirming unit 240.

At the step 2030, when the move-destination BES appliance can access the disk storing the being moved partitioned data, the processing is advanced to a step 2040. To the contrary, when the move-destination BES appliance cannot access this disk, the processing is advanced to a step 2100. At the step 2100, a notification of "not changeable" is issued to system administrator, and then the processing is ended.

At a step 2040, the completion of the data processing for the being moved partitioned data is instructed to the data processing unit 210 of the move-source BES appliance.

At a step 2050, the commencement of the data processing for the being moved partitioned data is instructed to the data processing unit 210 of the move-destination BES appliance.

At a step 2060, the move-source BES appliance of the being moved partitioned data entry in the FES system management information 150 is changed into the move-destination BES appliance. The subsequent processing related to the partitioned data is allocated to the move-destination BES appliance.

At a step 2070, the commencement of the service is instructed to the client-request decomposition unit 110 of the FES appliance.

This processing changes a BES appliance which processes certain partitioned data, and may also be carried out by the BES load monitoring unit 430 which manages a load of a BES appliance. Further, this processing may be carried out in the following operation. That is, the BES-side edge of the line for connecting a symbol indicative of a BES appliance to a non-use rectangular shape indicative of a disk is moved to another BES appliance on the GUI 410.

Figure 15:
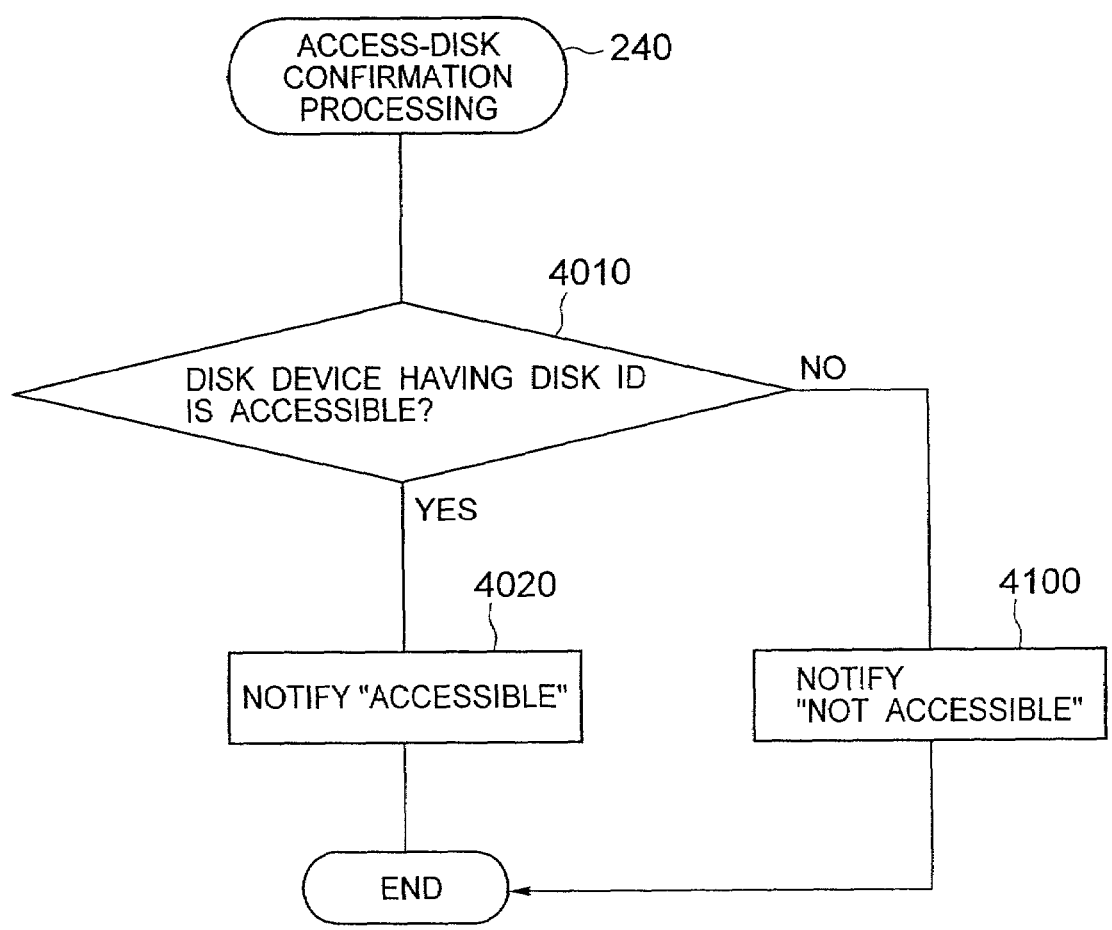
FIG. 15 shows a processing flow of the access-disk confirmation processing in the BES appliance.

FIG. 15 is a flow chart of the access disk confirmation processing 240 in the BES appliance 200. The access-disk confirmation process 240 accepts a disk ID used to identify a disk and confirms whether or not the disk having the disk ID can be accessed.

At a step 4010, when the disk 510 having the disk ID can be accessed, the processing is advanced to a step 4020 at which a notification of "accessible" is issued. To the contrary, when the disk 510 cannot be accessed, the processing is advanced to a step 4100 at which "non-accessible" is issued. The confirmation of the disk 510 may be carried out in such a manner that the serial number obtained by issuing an "Inquiry" SCSI command is compared with the disk ID. Alternatively, this disk confirmation may be carried out by writing the disk ID into the specific area of the disk and by reading this written disk ID.

Figure 16:
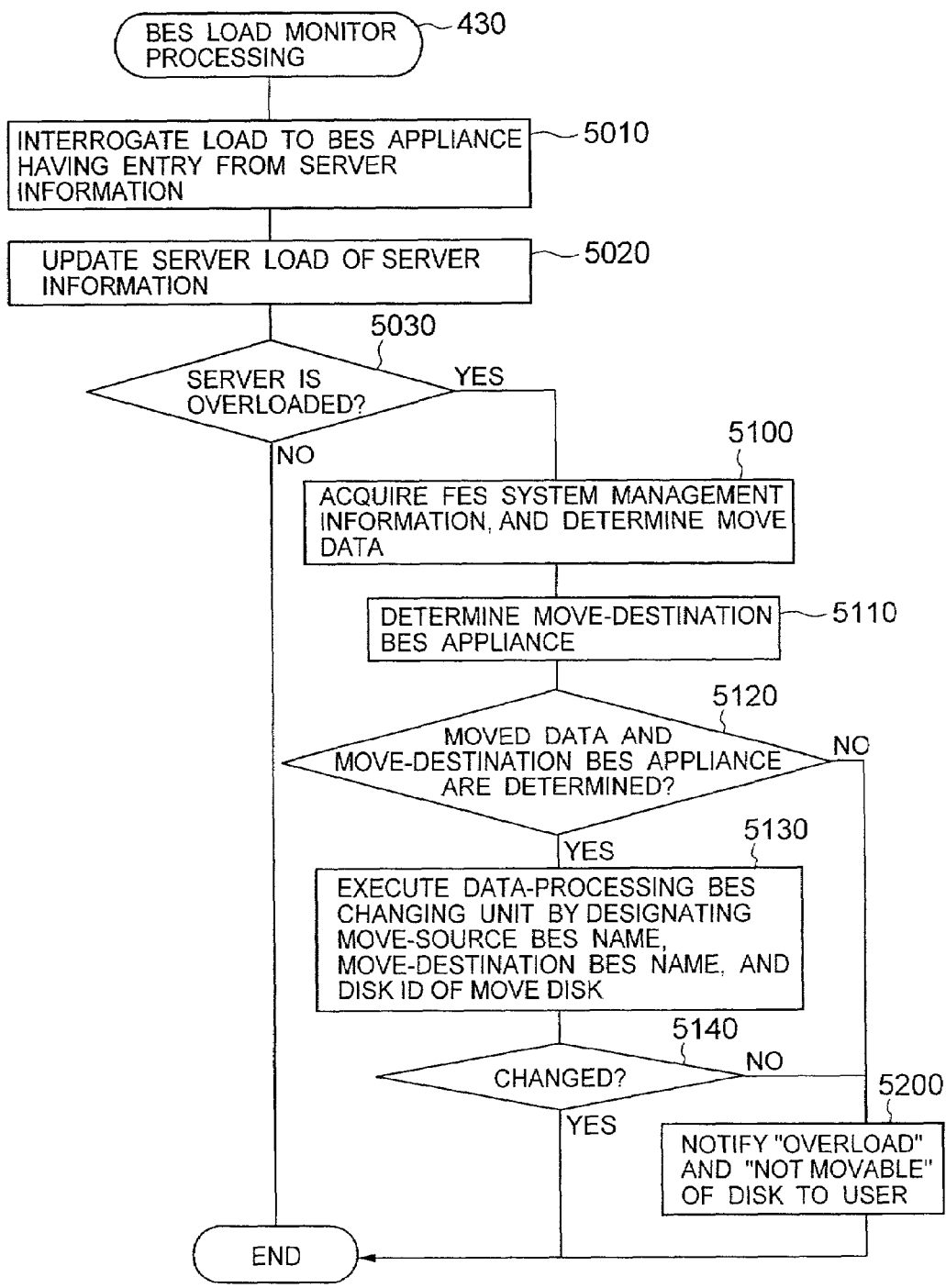
FIG. 16 shows a processing flow of the BES-load monitor processing in the system management server program.

Referring now to FIG. 16, the BES load monitor processing 430 will be explained. In the BES load monitor processing 430, when a server appliance having a heavy workload is found out by monitoring loads of server appliances, the BES load monitor processing 430 changes system configuration so that the data, which is processed by the server appliance having a heavy workload, is processed by another server appliance to distribute the load. This processing is carried out in the system management server 400 in a periodic manner.

At a step 5010, the system management server 400 interrogates loads of BES appliances having the entry in the server information 480.

At a step 5020, the server loads of the server information 480 are updated.

At a step 5030, when there is no overloaded server, the processing is ended. To the contrary, when an overloaded server is detected, the processing is advanced to a step 5100.

At this step 5100, the FES appliance, to which the overloaded BES appliance belongs, is acquired from the server information 480. The FES system management information 150 is acquired from the FES appliance. The entries, in which the overloaded BES appliance becomes the data processing BES appliance, are derived. Then, the data (disk) to be moved, this means a BES appliance processing the data will be changed, is determined among these entries. As the determining method, for instance, the partitioned data having the largest disk load may be determined to be moved, which means to be processed by another server appliance.

At a step 5110, BES appliances-belonging to the same FES appliance as the overloaded BES appliance are derived from the server information 480. Then, a BES appliance which becomes the data destination is determined from the retrieved BES appliances. As the BES appliance determining method, for example, a BES appliance having a smallest load may be determined as a destination BES appliance.

At a step 5120, when data to be moved and a destination BES appliance cannot be determined, the processing is advanced to a step 5130. When any one of the data to be moved and a destination BES appliance cannot be determined, the processing is advanced to a step 5200.

At this step 5130, the data-processing BES changing process 120 is carried out by designating the BES appliance, in which the overload is detected, as a source BES appliance, and by designating the moved data determined at the step 5100 and the destination BES determined at the step 5110. Thereby, a BES appliance processing the data is changed from the move-source BES appliance into the move-destination BES appliance, so that the load of the move-source BES appliance can be reduced.

At a step 5140, when a BES appliance for processing the data can be changed, the processing is ended. To the contrary, when a BES appliance for processing the data cannot be changed, the processing is advanced to a step 5200.

At the step 5200, a notification that the BES appliance is over-loaded and the disk cannot be moved is issued to a system administrator, and then the processing is ended.

Figure 17:
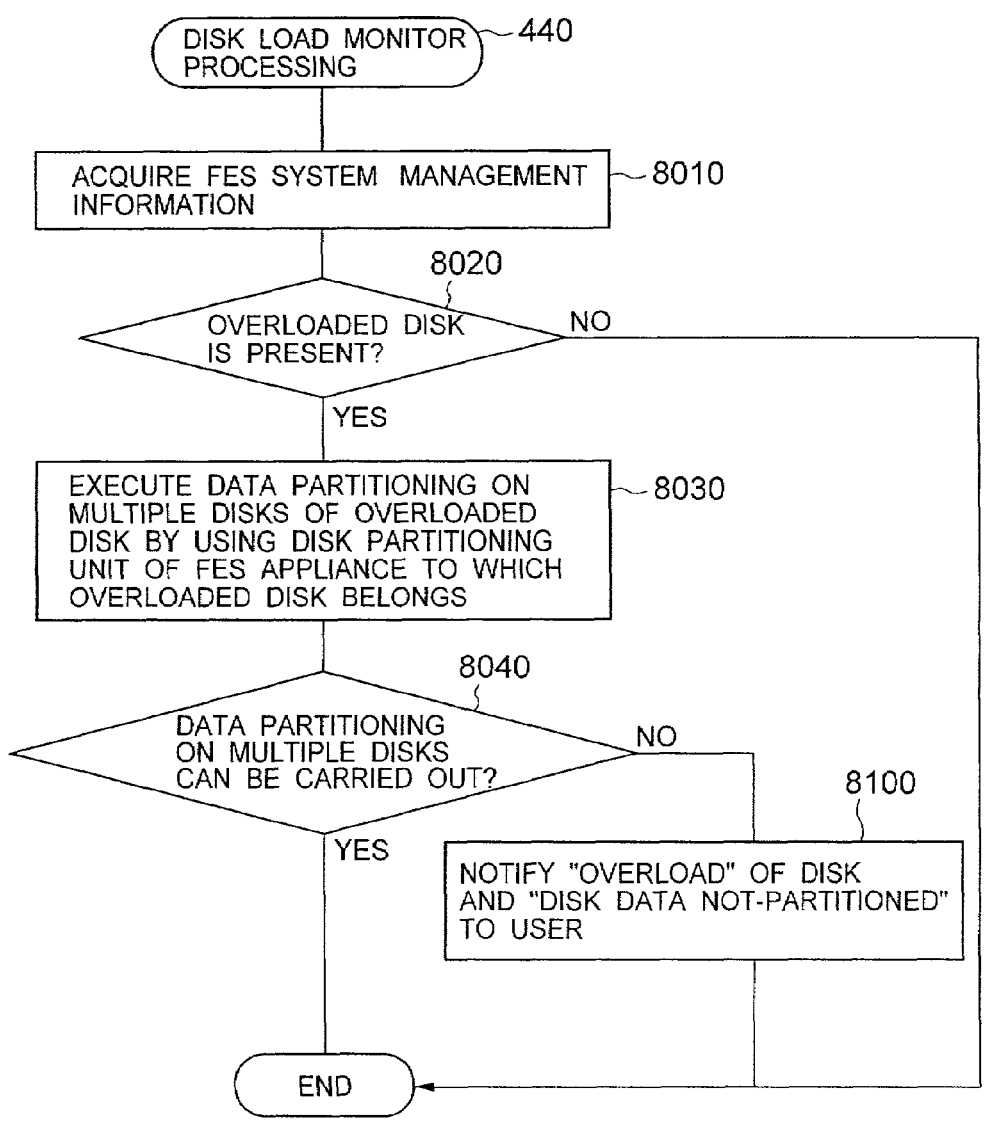
FIG. 17 shows a processing flow of the disk-load monitor processing in the system management server program.

The above-explained BES load monitor processing 430 is the processing for distributing the loads of the server appliances. There is such a case that I/O of a disk 510 accessed by a server appliance becomes a bottleneck of the system. To avoid this, the disk load monitor processing 440 is carried out by the system management server 400 in a regular manner. Referring now to FIG. 17, the disk load monitor processing 440 will be explained.

At a step 8010, the FES system management information 150 is acquired from the FES appliance having the entry in the server information 150.

At a step 8020, when there is an overloaded disk, the processing is advanced to a step 8030. To the contrary, when there is no overloaded disk, the processing is ended. In the determination of the overloaded disk, for instance, the disk load monitor processing 440 judges the overload when the disk I/O of the FES system management information 150 exceeds a certain threshold value.

At a step 8030, the data partitioning on multiple disks of the overloaded disk is executed by the disk partitioning unit 130 of the FES appliance to which the overloaded disk belongs.

At a step 8040, when the data partitioning on the multiple disks can be carried out, the processing is ended. To the contrary, when the data partitioning on multiple disks cannot be carried out, the processing is advanced to a step 8100.

At the step 8100, when the data partitioning on multiple disks cannot be carried out, a notification that the disk is overloaded and the data partitioning on multiple disks cannot be carried out is issued to a system administrator.

In this processing, the disk load monitor processing 440 monitors the load of the disk accessed by the BES appliance executing the data processing. When a disk having the heavy load is found out, the data stored in this disk having the heavy load is further partitioned, and then the further-partitioned data are stored into other disks. The BES appliance can access the disk storing the further-partitioned data during this processing, so that the disk load monitor processing 440 may distribute the disk load without stopping the service provided by the system.

Figure 18:
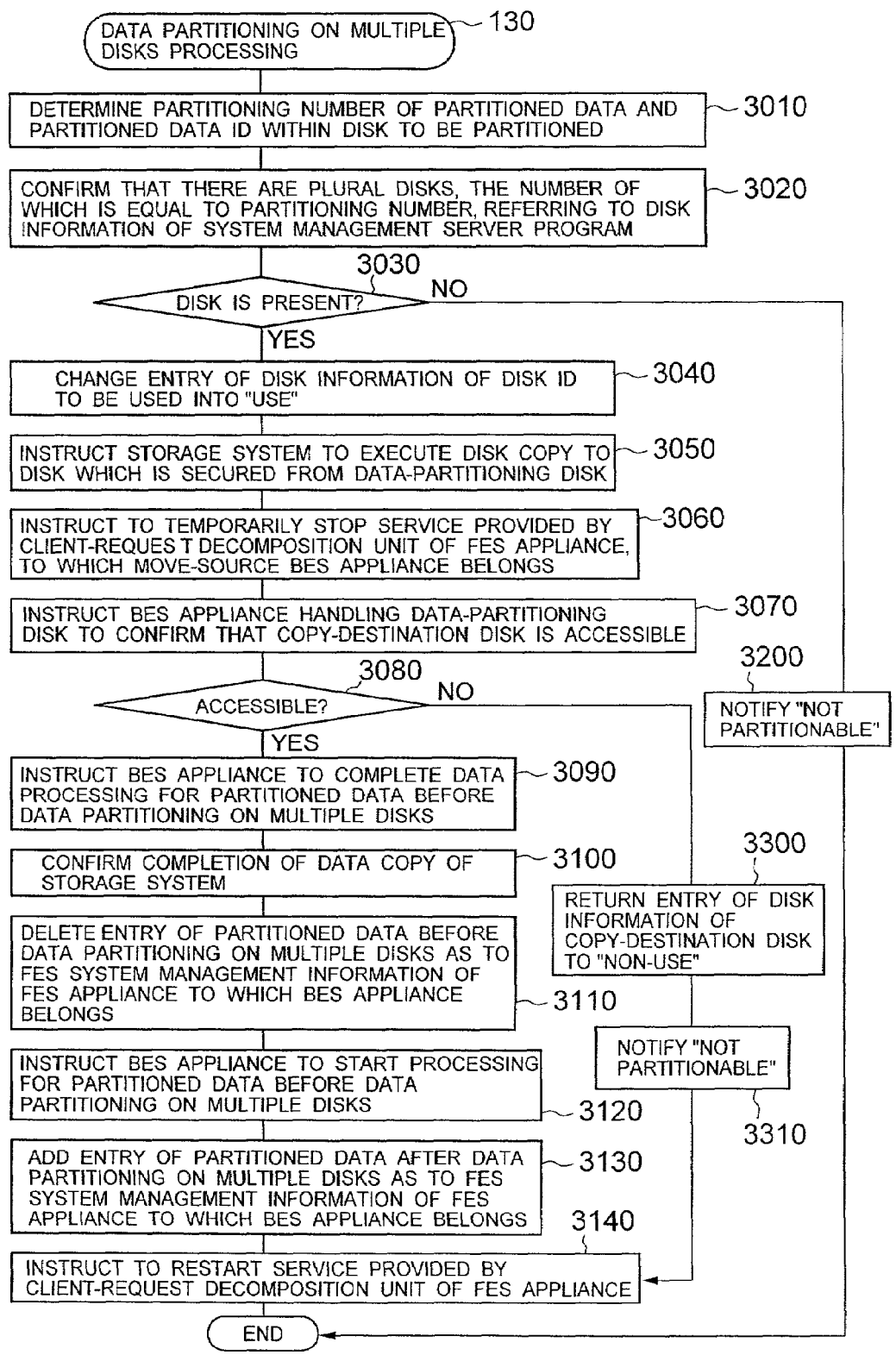
FIG. 18 shows a processing flow of the disk partition processing in the FES appliance.

Referring now to FIG. 18, a description will be made of the data partition processing on multiple disks, which is called from the disk load monitor processing 440.

At a step 3010, the partitioning number of the data to be partitioned, and the partitioned data ID are determined.

At a step 3020, it is confirmed that there are sufficient disks, the number of which is equal to the partitioning number, referring to the disk information 485.

At a step 3030, when there are the disks the number of which is equal to the total partitioning number, the processing is advanced to a step 3040. To the contrary, when there is no such a disk, a notification of "not partitioned" is issued at a step 3200.

At a step 3040, the use condition of the entry corresponding to the disk information 485 secured at the step 3020 is changed into the "use."

At a step 3050, the disk copy instruction is issued to the data copy unit 550 of the storage system 50 to copy the data from the disk to be partitioned onto the disks secured at the step 3020.

At a step 3060, the service temporary interrupt is instructed to the client-request decomposition unit 110 of the FFS appliance to which the BES appliance handling the data to be partitioned belongs. The BES appliance will be referred to the "objective BES appliance" in this processing.

At a step 3070, the execution of the access disk confirmation processing 240 to the disk 510 secured at the step 3020 is instructed to the BES appliance handling the data to be partitioned.

At a step 3080, when the disk can be accessed, the processing is advanced to a step 3090. To the contrary, when the disk cannot be accessed, the entry of the disk information 485 of the disk secured at the step 3020 is returned to "non-use" at a step 3300. At the next step 3310, a notification of "not partitioned" is issued, and then the processing is advanced to a step 3140.

At a step 3090, the end of the processing for the data to be partitioned is instructed to the objective BES appliance.

At a step 3110, the entry of the data to be partitioned of the FES system management information 150 of the FES appliance to which the objective BES appliance belongs is deleted.

At a step 3120, the commencement of the data processing to the partitioned data is instructed to the objective BES appliance.

At a step 3130, the entry is added to the FES system management information 150 of the FES appliance to which the objective BES appliance belongs. This entry is constructed of the partitioned data ID after the data partition operation, the disk ID, and the objective BES appliance.

At a step 3140, the restart of the service is instructed to the client-request decomposition unit 110 of the FES appliance to which the objective BES appliance belongs.

This processing is the following processing. That is, certain partitioned data is further partitioned to at least two. The disk for storing the further partitioned data is prepared. It is confirmed that the BES appliance can access the above-described disk. Thereby, the system operation is continued. This processing may be carried out also when the disk storing certain partitioned data and the data partition is selected from the menu, by the GUI 410 in addition to the disk load monitoring unit 440.

The load of the BES appliance is distributed by the BES load monitor processing 430, and the load of the disk is distributed by the disk load monitor processing 440. However, since the BES 200 accesses to the disk 510 via the port, there are some cases that the processing performance of the port may constitute the bottleneck of the system.

Figure 19:
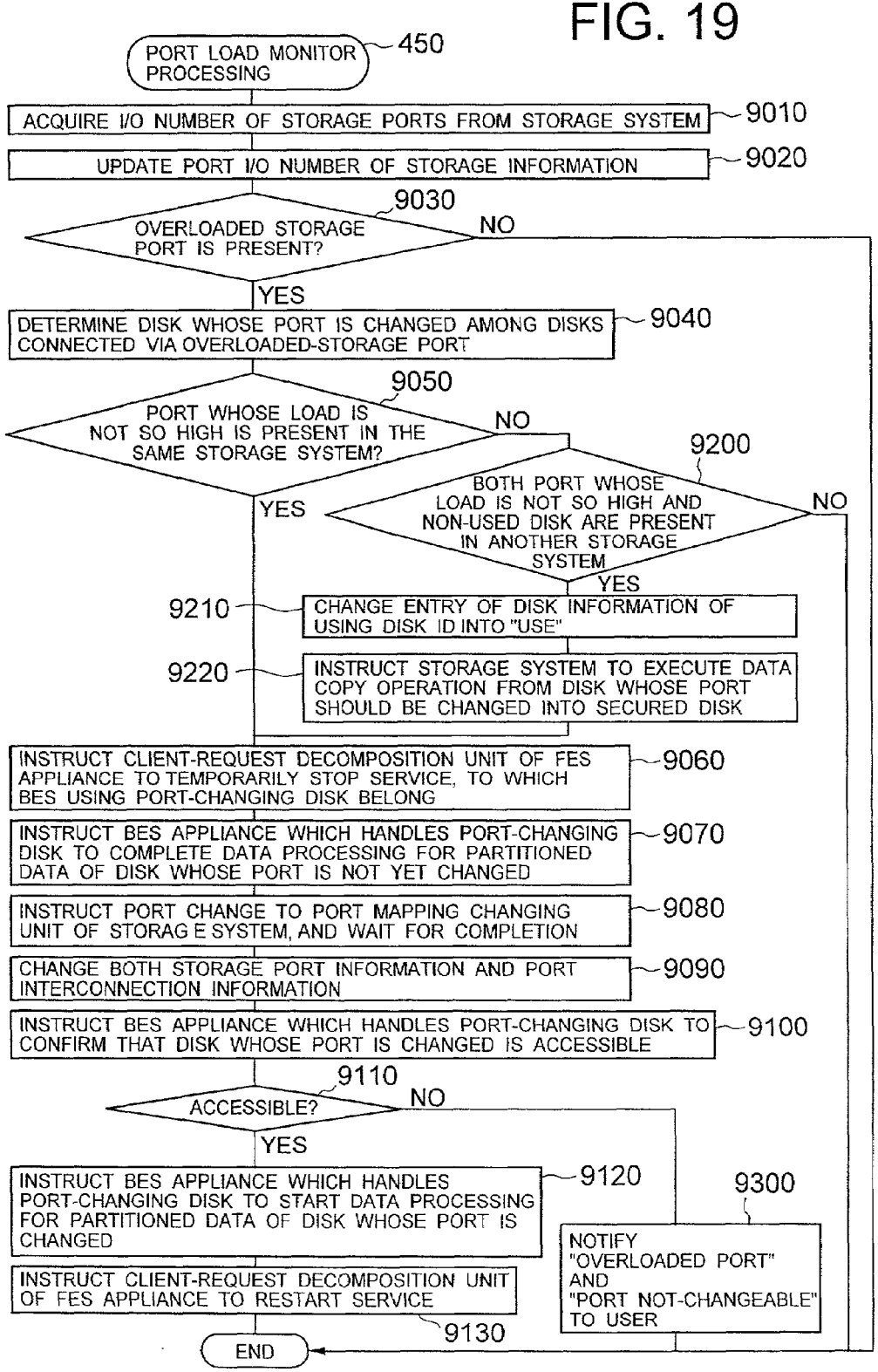
FIG. 19 shows a processing flow of the port-load monitor processing in the system management server program.

When there are plural ports in the storage system, the storage port load monitor processing 450 is employed to distribute the loads of the ports, which will now be explained with reference to FIG. 19.

At a step 9010, I/O loads of storage ports are acquired from the storage system 50.

At a step 9020, the port loads of the storage port information 490 are updated.

At a step 9030, when an overloaded storage port is present, the processing is advanced to a step 9040. To the contrary, when there is no such an overloaded storage port, the processing is ended.

At the step 9040, when an overloaded storage port is present, the disk connected via the overloaded storage port is derived from the port interconnection information 495, and then the disk the storage port of which is changed is determined. This disk is called the port-changing disk.

At a step 9050, referring to the storage port information 490, when there is a port whose load is not so high within the same storage system as the overloaded port, the processing is advanced to a step 9060. To the contrary, when there is no port whose load is not so high within the same storage system as the overloaded port, the processing is advanced to a step 9200.

At the step 9200, when there is no port whose load is not so high within the same storage system as the overloaded port, it is determined based on the storage port information 490 and the disk information 485 whether or not the port whose load is not so high and the non-used disk are present within another storage system. When such a determination cannot be made, the processing is ended. To the contrary, when such a determination can be made, the processing is advanced to a step 9210.

At the step 9210, the entry of the disk information 485 corresponding to the disk secured at the step 9200 is changed into "use."

At a step 9220, the data copy is instructed to the storage system, which copies the data from the port-changing source disk to the port-changing destination disk.

At a step 9060, the BES appliance using the port-changing (source) disk is derived from the port interconnect information 495. After the FES appliance to which this BES appliance belongs is acquired from the server information 480, the service temporary interrupt is instructed to the client-request decomposition unit 110 of the acquired FES appliance.

At a step 9070, the completion of the data processing is instructed to the BES appliance handling the port-changing (source) disk. This data processing is performed for the partitioned data stored in the disk whose port is not yet changed.

At a step 9080, the port changing instruction is issued to the port mapping change unit 560 of the storage system.

At a step 9090, the storage port information 490 and the port interconnection information 495 are changed.

At a step 9100, the confirmation of the data access possibility to the port-changing (source) disk is instructed to the BES appliance handling the port-changing (source) disk.

At a step 9110, when such an access can be done, the processing is advanced to a step 9120. To the contrary, when such an access cannot be done, the processing is advanced to a step 9300.

At a step 9120, to the BES appliance executing the access disk confirmation processing 240 at the step 9100, the commencement of the processing of the data stored in the port-changing (destination) disk is instructed.

At a step 9130, the restart of the service is instructed to the client-request decomposition unit 110 of the same FES appliance as that of the step 9060.

This processing is carried out in a periodic manner in the system management server 400. Also, in this processing, the port loads of the storage ports are balanced. Alternatively, as explained in the storage port information 490, it is possible to distribute the load of the server port by managing the server port information.

In the distributed computer system, it is possible to expand the computer system by the addition of the server appliance and the storage system without stopping the overall computer system.

When the server appliance is brought into a malfunction, it is possible to continue the operation of the computer system by connecting the disk, which is connected to the server appliance under malfunction, to another server appliance. As a result, it is possible to improve the failure-proof characteristic of the computer system.

In order to distribute the disk load, the system setting condition is automatically changed in such a manner that the data stored in the disk is partitioned into the plural data to process the partitioned data at the same time. Thereby, the system administrator can readily execute to distribute the disk load without stopping the computer system.

In order to distribute the port load, when the port used to interconnect the server and the disk is changed, the access to the disk whose port is changed is confirmed, and at the same time, the setting condition is automatically changed. Thereby, the computer system can be easily changed, and it is possible to avoid the system-down caused by the operation which is mistakenly performed by the system administrator.

The port used to interconnect the server and the disk is automatically changed, so that the throughput between the server and the disk can be maintained.

What is claimed is:

1. A computer system comprising:
    a front-end server connected to a network and adapted to receive requests from one or more client computers;
    a first back-end server connected to said front-end server and said client computers via said network and operative to receive I/O requests from said front-end server;
    a second back-end server connected to said front-end server and said client computers via said network and operative to receive I/O requests from said front-end server;
    a first plurality of storage units initially accessible by said first back-end server and not accessible by said second back-end server;
    a second plurality of storage units initially accessible by said second back-end server and not accessible by said first back-end server;
    a managing computer in data commnunication with said front-end server and said back-end servers via said network, said managing computer operative to obtain data access load conditions at each storage unit from said front-end server;
    a storage system, said storage system comprising said first plurality of storage units and said second plurality of storage units, wherein a communication port in said first back-end server and a communication port in said second back-end server can be configured for data communication with communication ports in said storage system; and
    a switch operative for data communication among devices connected to said switch, said first back-end server and said second back-end server being connected to said switch, said storage system being connected to said switch so that said first and second back-end servers can access data stored in said first and second plurality of storage units, said switch further being operative to direct data requests from one of said first and second back-end servers to a specified storage unit in said storage system,
    wherein, based on said data access load conditions, including a condition in that a load at a source storage unit in said first plurality of storage units exceeds a predetermined amount, said managing computer operative to:
        select a destination storage unit in said second plurality of storage units;
        copy a first data partition from said source storage unit to said destination storage unit and subsequently delete said first data partition from said source storage unit;
        grant said first back-end server access to said destination storage unit; and
        transmit information to said front-end server that said first data partition is to be accessed by said first back-end server via said destination storage unit.

2. The system of claim 1, further comprising a second storage system including a third plurality of storage units, wherein communication ports in said second storage system can be configured for data communication with communication ports in said first back-end server and said second back-end server.

3. The system of claim 1 wherein additional data partitions in said source storage unit can be similarly moved to additional storage units, said first back-end server being granted access to said additional storage units, said front-end server being informed that said additional data partitions are to be accessed on said additional storage units.

4. The system of claim 1 wherein said management computer includes a display unit operable to present a first display area and a second display area,
said first display area to display one or more first symbols that represent said first back-end server, said second back-end server, or any of said first plurality of storage units, and having second symbols that represent communication paths,
said second display area having third symbols that represent any of said second plurality of storage units,
wherein said management computer selects the destination storage unit in accordance with receiving an indication for moving one of said third symbols from said second display area into said first display area.

5. A computer system comprising:
a first server operative to receive I/O requests from a requesting computer;
a second server;
a managing computer in data communication with said first server;
a first storage system comprising a plurality of storage units;
a second storage system comprising a plurality of storage units; and
a switch operative for data communication among devices connected to said switch, said first server and said second server being connected to said switch, said first and storage systems being connected to said switch so that said first and second servers can access data stored in said storage units thereof, said switch further being operative to direct data requests from one of said first and second to a specified storage unit in said first and second storage systems,
wherein a communication port in said first server and a communication port in said second server can be configured for data communication with communication ports in said first and second storage systems respectively,
said first server in data communication with a first storage unit in said first storage system,
said managing computer operative to obtain loading information relating to data access load conditions of said first server,
based on said data access load conditions, including a condition in that a load of said first server exceeds a predetermined amount, said managing computer operative to:
select a second storage unit from either said first storage system or said second storage system;
perform a move operation of a first data partition stored in said first storage unit to said second storage unit and subsequently delete said first data partition from said first storage unit;
perform a first configuration operation granting said first server access to said second storage unit; and
transmit information to said requesting computer that said first data partition is to be accessed by said first server on said second storage unit.

6. The system of claim 5 wherein the managing computer is further operative to perform a second configuration operation wherein said second server is granted access to said first data partition on said second storage unit, if said first configuration operation cannot be performed, and wherein information is transmitted to said requesting computer that said first data partition is to be accessed by said second server on said second storage unit.

7. The system of claim 6 wherein said requesting computer is a front-end server that receives requests from client machines, said first server and second server each being a back-end server which receives requests from said front-end server.

8. The system of claim 6 wherein said first storage unit stores a plurality of data partitions, said first data partition being one of said data partitions, wherein said managing computer is further operative to move additional data partitions from among said plurality of data partitions to additional storage units based on data access load conditions obtained from said first server.

9. The system of claim 5 wherein said managing computer is further being operative to obtain loading information from said first server or said switching device.

10. The system of claim 5 wherein said management computer includes a display unit operable to present a first display area and a second display area,
said first display area to display one or more first elements representative of said first server, or said first storage unit, and second elements representative of communication paths among said first elements,
said second display area to display one or more third elements representative of said second storage unit,
wherein said management computer performs said first configuration operation in accordance with receiving an indication for moving one of said third elements from said second display area into said first display area.

11. A computer system comprising:
a requesting computer including a front-end server for issuing an I/O request in response to a signal from a client computer;
a plurality of back-end servers, connected to the front end server through a network, for receiving the I/O request;
a storage device connected to the plurality of back-end servers through a connection port provided therein, including a plurality of disks for storing data to be processed in response to the I/O request received by at least one of the plurality of back-end server, said storage device comprising a first plurality of storage units and a second plurality of storage units, wherein a communication port in a first back-end server and a communication port in a second back-end server can be configured for data communication with communication ports in said storage device;
a switch operative for data communication among devices connected to said switch, said first back-end server and said second back-end server being connected to said switch, said storage system being connected to said switch so that said first and second back-end servers can access data stored in said first and second plurality of storage units, said switch further being operative to direct data requests from one of said first and second back-end servers to a specified storage unit in said storage system; and a management computer connected to the requesting computer and the plurality of back-end servers through the network for monitoring load conditions of the plurality of back-end servers operating in response to the I/O request via the requesting computer;

the management computer including a display unit showing two kinds of symbols, one of which shows the back-end server receiving the I/O request, the front-end server, or a first disk, the other of which is representative of connections among the back-end server, the front-end server and the first disk, the management computer monitoring load conditions at the ports, a part of data stored in any of the disks being controlled to be copied to another disk in response to a load in excess of a predetermined amount;

wherein a part of data in a first disk processed by a first back-end server of the plurality of back-end servers is controlled to be copied to a second disk accessed by a second back-end server in case that a load of the first back-end server indicated by a number of I/O access for the first disk excesses a predetermined value, and controlled to be deleted from the first disk, and wherein the first disk is not accessible by the second back-end server before the part of data stored by the first disk is copied to the second disk and deleted from the first disk, and wherein the part of data copied to the second disk is accessible by both the first and the second servers.

* * * * *